United States Patent Office 3,320,589
Patented May 16, 1967

3,320,589
SEQUENTIALLY OPERABLE AUTOMATIC
CONTROL SYSTEMS
Hermann Børge Funck Jensen, 16 Moller Meyersvej,
Risskov, Denmark
Filed Nov. 26, 1962, Ser. No. 239,926
Claims priority, application Great Britain, Nov. 27, 1961,
42,322/61
23 Claims. (Cl. 340—147)

This is a continuation-in-part application of my application Ser. No. 180,159, filed Mar. 16, 1962, which is a continuation of my application Ser. No. 689,620 filed Oct. 1, 1957, now abandoned, and relating to automatic control systems.

The present invention relates to automation of working machines.

It is a general purpose of the invention to provide control means for use with a working machine having machine function means controlling a plurality of machine functions and adapted to be actuated by electrical command signals and data signal means operable to produce data signals indicative of the progress of the operation cycle of machine functions and having a progressively operable switch means operable to provide data logging and to control transmission of command signals in programmed sequence responding to the data logging and which is safe and fast in operation.

It is a further object of the invention to provide control means as referred to hereinabove which is capable of responding safely to flash data signals.

Still a further purpose of the invention is to provide control means of the type referred to, in which delay in the transmission of the command signals caused by the indexing time of the progressive switch arrangement can be avoided.

Still a further purpose of the invention is to provide control means of the type referred to which includes flash responsive actuating means for the machine function means.

Still a further purpose of the invention is to provide control means of the type referred to which includes flash sensitive data signal means operable for example to produce data signals in response to throw-out of a work-piece from a working machine.

Still a further purpose of the invention is to provide control means of the type referred to, in which the initiation of an indexing signal for switching the progressive switch arrangement can be caused by means of a flash data signal, whereafter a well-defined indexing signal is built up with a duration sufficient to switch the progressive switch arrangement.

Still a further purpose of the invention is to provide control means of the type referred to having index signal producing means capable of producing a plurality of timely spaced well-defined indexing signals from a continuously standing data signal or a single well-defined indexing signal from a flash data signal.

Further objects, purposes and advantages of the invention will appear from the following description with reference to the accompanying drawing, in which.

In the circuits to be described, transistors are used and in explaining the operation of the transistors, a "closed" transistor means a transistor which is switched on and thereby closes the circuit on being conductive and an "open" transistor is one which is turned off so that its circuit is open.

Figure 1:
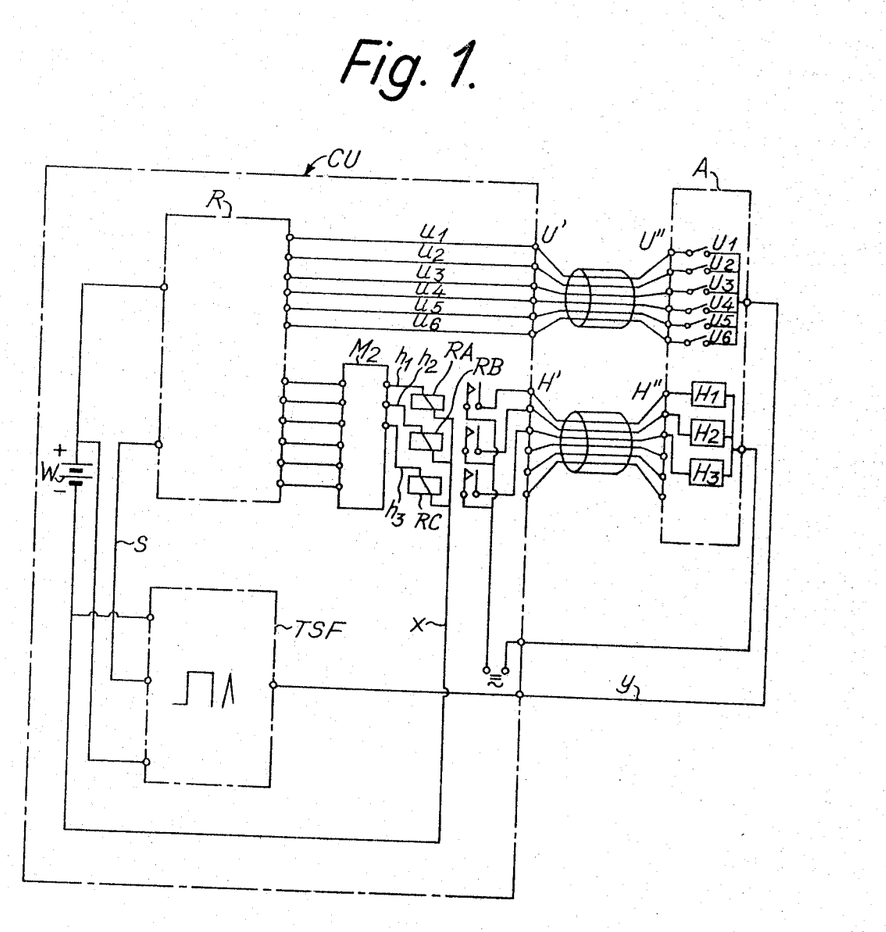
FIGURE 1 is a schematic diagrammatic illustration of a sequence control.

In FIGURE 1 CU is a control unit including a progressive switch arrangement R operable as a counter. Included in the control unit is an indexing device for switching the progressive switch by means of data signals which are produced on the working machine generally referred to by A at stages of the operation cycle of machine functions so as to effectively provide data logging by means of the counter.

The apparatus further includes means operable at stages of the progressive switch arrangement to transmit command signals to the machine function means as disclosed in my U.K. Patents Nos. 878,902 and 878,903.

Neither the lay-out nor programming of the automatic cycle of the machine which is described in great detail in my U.K. patents referred to hereabove will be described in any great detail.

The machine equipment includes a plurality of data signal means operable to produce data signals indicative of the progress of the automatic cycle of the machine and exemplified by sensing switches referred to by $U_1$, $U_2$, $U_3$ ... etc. each of which is included in a data signal line $u_1$, $u_2$, $u_3$ ... etc.

The one terminal of all the data signal switches are connected with a common line $y$.

In a similar way one terminal of the machine function actuators shown as relays RA, RB, Rc, are connected to a common line $x$.

The control apparatus CU which is shown schematically in FIGURE 1 is provided with corresponding sockets or other complementary connector means referred to by U' and H' adapted to be connected respectively with the sockets U″ and H″ on the machine A by cable connections.

In the control apparatus the common lead $y$ of the data signal lines is connected to the input of a network to be more fully described in the following and referred to by TSF, the output of which through a lead is connected to the input of the progressive switch arrangement R. A voltage source W is shown operable to supply the TSF element with voltage as well as to supply the progressive switch element R with positive voltage.

As explained in great detail in my U.K. patents referred to hereinbefore the progressive switch arrangement which operates as a digital counter device has a plurality of switch stages, each of which together with a predetermined one of the sensing switches $U_1$, $U_2$, $U_3$ effectively provides a coincidence means operable to produce a data signal through the line $y$ to thereby switch the progressive switch arrangement and thereby render another one of the coincidence means operable simultaneously with providing data logging in the form of numerical values or digits of the digital counter device.

In FIGURE 1 the data signal lines which extend from the progressive switch arrangement R are referred to by $u_1$, $u_2$, $u_3$, $u_4$, $u_5$ and $u_6$ and the command signal lines are referred to by $h_1$, $h_2$ and $h_3$.

In the control apparatus command signal control relays are included referred to by RA, RB, and RC which are of the on-off type switching from on to off and vice versa in response to receipt of consecutive signals as explained in my U.K. patents referred to hereabove.

In order to distribute the command signals to the command signal control relays, a distributor member or plug board $M_2$ is included in the command signal lines operable to connect the relay windings with the progressive switch arrangement to effectively apply the consecutive signals to the relays to thereby cause the initiation and termination of the respective correlated machine function members at the predetermined stages of the progressive switch arrangement.

Each of the closings of the sensing switches provides a signal to the TSF element which, as will be described more fully in the following, is in the form of a network which upon receipt of a data signal controls the shifting of the progressive switch arrangement and which also responds to flash signals.

The signals produced by the sensing device are in the form of flash signals, and the TSF element is so designed that it is capable of producing a single well-defined signal from a flash input signal.

In the embodiments of FIGURES 2–7, the progressive switch arrangement is in the form of a uniselector or step switch of the telephone component type having two banks or decks $D_1$ and $D_2$. The data signal lines are connected with the terminals of the deck $D_1$, and the command signal lines are connected with the terminals of the deck $D_2$. The stepping arrangement is of the well-known indirect drive type with a ratchet mechanism which is operated by a spring which in its turn is tensioned by energization of a solenoid.

In such an arrangement a switch 52 is included in series with the solenoid 50 and is actuated to be opened when the drive spring has been tensioned and is again closed when the step has been completed.

Figure 2:
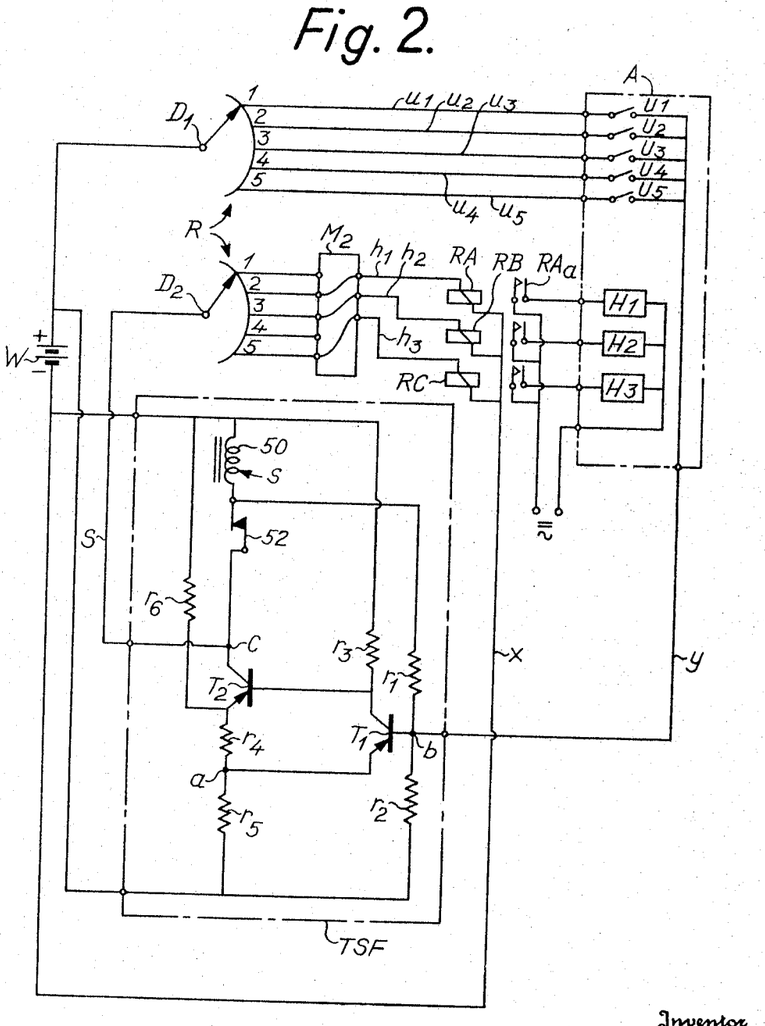
FIGURE 2 is a more detailed circuit arrangement of the apparatus of FIGURE 1.

The TSF network is together with the two decks of the progressive switch arrangement and the other components included in the circuits with a voltage source W as shown in FIGURE 2.

The TSF network has two transistors $T_1$ and $T_2$ connected in a bi-stable circuit adapted to produce indexing signals for the stepping arrangement in response to data signals received from the common lead $y$. The transistor $T_1$ is normally closed but will be opened when it receives a positive data signal and will thereby close the transistor $T_2$ which is normally open. Hereby current will pass through the transistor $T_2$, the switch 52 and the solenoid 50 whereby the stepping will be initiated. When the switch 52 is opened during the stepping, i.e., after the movable wipers of the progressive switch R have left their contacts and before they have reached their following stage, the bi-stable transistor circuit will be switched back to its first normal condition where it is ready to advance the indexing means another stage in response to the next data signal.

By designing the TSF network in such a manner that the data signal received from the common lead $y$ triggers the bi-stable circuit to control the advancement of the stepping switch and the circuit is reversed to its normal condition by the stepping arrangement the data signal becomes important; thus the data signal does not need to be maintained during the period necessary for accomplishing the one stage advancement of the stepping switch and also very weak signals can be used.

More specifically, the input line $y$ is connected with a voltage divider $r_1$, $r_2$ in series with the solenoid 50. The input point $b$ is connected directly with the base of the transistor $T_1$. The collector of the transistor $T_1$ is connected with the base of the transistor $T_2$ and through a biasing resistor $r_3$ to the negative battery terminal. From a voltage divider $r_5$, $r_4$, $r_6$ voltage is supplied to the emitters of both transistors; namely, to the transistor $T_2$ from a point between resistors $r_4$ and $r_6$ and to the transistor $T_1$ from the point $a$ between the resistors $r_4$ and $r_5$. The collector of the transistor $T_2$ is connected with the movable wiper of the command signal distributor deck $D_2$ as well as with the negative battery terminal through the switch 52 and the solenoid 50.

The voltage dividers are so designed that the voltage of the input point $b$ is more negative than the voltage at the point $a$ so that the transistor $T_1$ will normally be closed whereby the voltage divider comprising the resistor $r_5$ in series with the resistor $r_3$ is effective to apply a positive potential on the base of the transistor $T_2$. In its initial condition therefore the transistor $T_2$ is open so that no energizing current is drawn through the solenoid 50.

It is supposed that the progressive switch is in position on in which the data signal switch $U_1$ is operative in that data signal line $u_1$. When the switch $U_1$ is closed, the circuit is closed from the positive terminal of the voltage source W, the wiper of the deck $D_1$, the data signal line $u_1$, the common line $y$, the resistor $r_1$, and the solenoid 50 to the negative terminal of the voltage source W. Due to the relatively large resistance in the resistor $r_1$ the current through the solenoid 50 will hereby be unable to operate the stepping switch. When, however, this circuit is closed the potential at the point $b$ is increased which renders the base of the transistor $T_1$ more positive whereby this transistor will be opened and break the circuit from the negative terminal of the voltage source W, the resistor $r_3$, the transistor $T_1$ and the resistor $r_5$. This results in the base of the transistor $T_2$ becoming negative whereby this transistor will be closed. Since as mentioned hereabove the switch 52 is closed current will flow through the solenoid 50, the switch 52, the transistor $T_2$ and the resistor $r_4$ and $r_5$ which will initiate the stepping of the progressive switch.

When the transistor $T_2$ is closed, the relatively large resistance $r_6$ will be short-circuited so that the voltage at the point $a$ will now be determined by the resistors $r_4$ and $r_5$ in series with the solenoid 50. This voltage divider is so designed that the potential at the point $c$ is positive. This potential is applied through a line to the wiper of the machine function deck $D_2$. Through the potential at the point $a$ between resistors $r_4$ and $r_5$ hereby will be more positive than the potential at the point $c$, the voltage dividers are designed in such a manner that this potential is still less positive than the potential at the point $b$, even when the data signal on the line $y$ has disappeared. Hereby the circuit is stabilized in its triggered condition in which the transistor $T_1$ is open and the transistor $T_2$ is closed.

In this condition sufficient current will flow through the solenoid 50 to operate the stepping mechanism, the activation of which will open the switch 52 whereby the resistor $r_6$ again becomes effective in the voltage divider $r_4$, $r_5$, $r_6$ whereby the potential at the point $a$ will be so much increased that it exceeds the potential at the point $b$ whereby the transistor $T_1$ will be closed. Since the collector of the transistor $T_1$ is connected with the positive voltage source through the resistor $r_5$, the potential thereon and on the base of the transistor $T_2$ will be increased so much that the base of the transistor $T_2$ becomes more positive than its emitter whereby this transistor will be opened.

When the switch 52 is closed automatically at the completion of the shifting of the progressive switch, it will be seen that the entire circuit will now again be in its initial condition.

In position one of the progressive switch arrangement current will flow from the point $c$, the wiper of the deck $D_2$ to the respective relay, provided there is a connection in the plug board $M_2$. With the connection shown in FIGURE 2, this will not be the case in position one of the stepping switch arrangement, so that the signal applied to the input of the TSF network in position one only will result in advancement of the stepping switch arrangement to position two.

In this position the above-described opening and closing of the transistors $T_1$ and $T_2$ will be repeated and with the cross-connection shown in the plug board $M_2$ current will flow from the point $c$ through the command signal line $h_2$ and the relay winding RA, whereby the relay will operate its contact to be opened or closed and thereby cause activation of the member $H_1$ to initiate or terminate a machine function. It is here supposed that the relays are of the impulse-sensitive type which alternately open and close their contacts upon receipt of a command signal.

Figure 3:
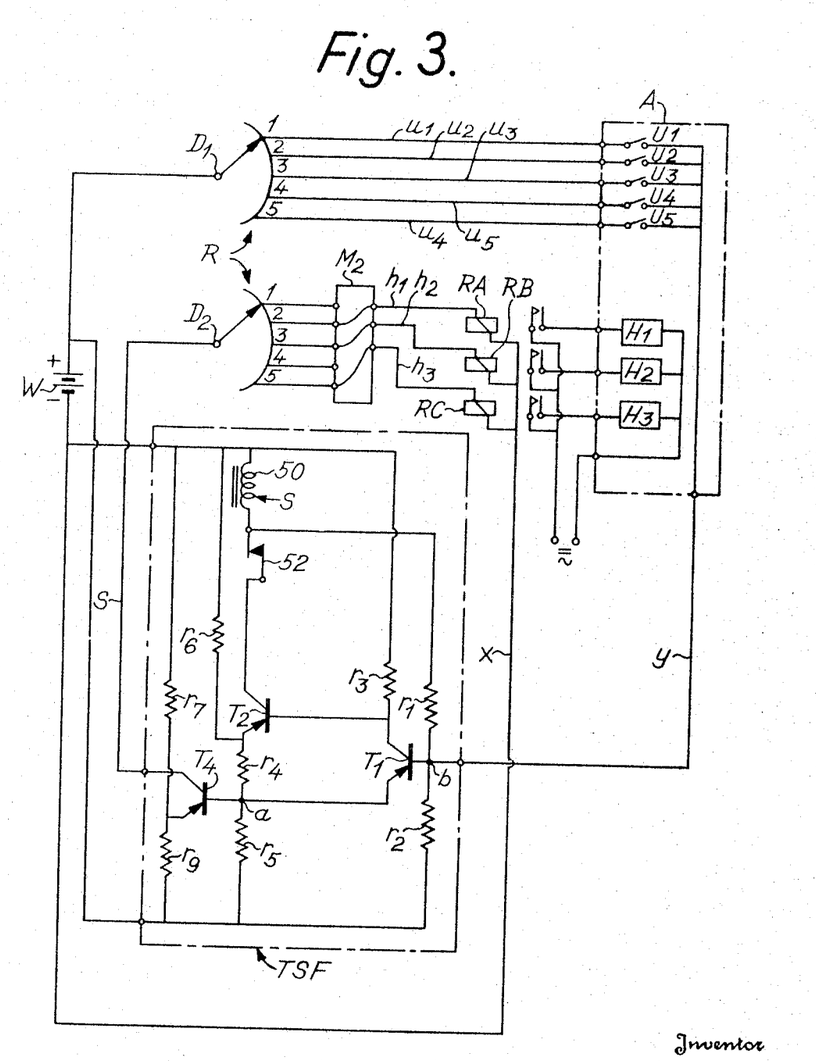
FIGURE 3 is a circuit arrangement of the apparatus of FIGURE 1 in a second embodiment.

The embodiment shown in FIGURE 3 differs from that shown in FIGURE 2 only in that the resistor $r_5$ is shunted by the emitter base section of a transistor $T_4$ in series with a resistor $r_9$ which together with a resistor $r_7$ is connected as a voltage divider and that the command signal to the deck $D_2$ is taken from the collector of the transistor $T_4$.

The voltage divider $r_7$, $r_9$ is so designed that the voltage on the emitter of the transistor $T_4$ will be more positive than its potential on the base when the transistor $T_2$ is closed and more negative than the base potential when the transistor $T_2$ is open. This means that the transistor $T_2$ controls the transistor $T_4$ so that these two transistors will always be open and closed simultaneously. When closed the positive voltage on the emitter of $T_4$ is transmitted to the collector thereof and thereby to the machine function deck $D_2$. It will be seen that while the transistor $T_2$ in FIGURE 4 serves the combined purpose of operating the solenoid 50 and supplying voltage to the machine function deck $D_2$, these functions are now taken over by two separate transistors namely the transistor $T_2$ and the transistor $T_4$ respectively. By this arrangement a more well-defined output is available for each purpose.

With the indirect type drive of the stepping mechanism for the progressive switch arrangement, it is necessary that the switch 52 is closed, because otherwise the advancement could not be initiated. On the other hand the switch 52 after having been opened must not be closed again until the rotary wiper or other movable member of the stepping switch arrangement has been disconnected from that contact which represents the stage at which the data signal has been received, i.e., the contact which is connected with the respective data signal line in which the data switch U is connected. In the case of a faulty adjustment of the solenoid or the spring which results in too early reclosing of the switch 52, and if simultaneously the respective data signal switch is still closed so that a potential is applied to the base of the transistor $T_1$ from the line $y$, this will result in re-energization of the solenoid 50, and the stepping arrangement will receive a second signal so that instead of being advanced from one stage to the next following stage the progressive switch arrangement will be advanced two stages which, of course, again will result in faulty operation of the working machine.

This can be avoided by providing means operable to cancel the data signal at least during that part of the operation of the advancement means where a maintained data signal is able to cause re-energization of the solenoid.

In principle such cancellation means is in the form of a relay device which is included in the common lead $y$ in series with the switch 52 and which, when energized, provides a holding circuit in series with the switch 52 and which has a contact which breaks the $y$ line and operates as a cancellation switch for a maintained data signal.

In a mechanical stepping arrangement the mass and inertia of the movable parts can provide such a time constant of the stepping arrangement that a data signal can give rise to a second step if it is applied after the movable wiper of the deck $D_1$ has left that contact which is connected with the data signal line. This may be taken care of by a delay of such a relay device, but I have found it more convenient in practice to control the re-energization of the device by means operable in synchronism with the progressive switch arrangement and rather than relying on the operation of relays which always require some mechanical adjustment and may give rise to faulty operations I have found it convenient to include the means to control the cancellation in the TSF network.

Figure 4:
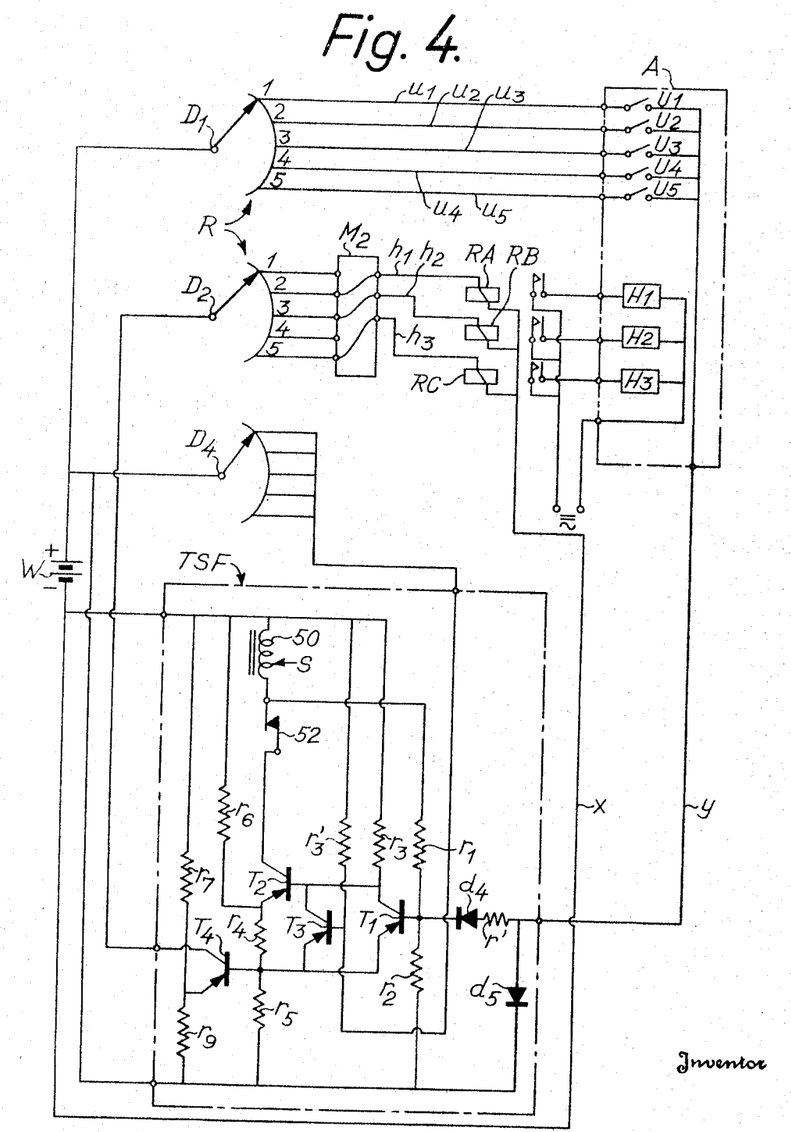
FIGURE 4 is a circuit arrangement of the apparatus of FIGURE 1 in a third embodiment.

For this purpose the TSF network may be constructed as shown in FIGURE 4 in which the transistor $T_1$ is shunted with a further transistor $T_3$, the base of which is connected with the stationary contacts of an extra deck $D_4$ of the uniselector. Since the transistor $T_1$ is shunted with the transistor $T_3$ this means that as long as the transistor $T_3$ is open it contributes to keep the transistor $T_2$ closed. When the transistor $T_3$ closes it short-circuits the transistor $T_1$ and thereby prevents this transistor from re-closing the transistor $T_2$ even in response to a standing data signal on the base of its transistor $T_1$. The transistor $T_3$ is connected with the stationary contacts of the uniselector deck $D_4$ and is kept open by means of the positive voltage from that deck as long as the wiper touches a contact. As soon as the stepping has been initiated and the wiper leaves the contact this voltage disappears, whereby the transistor $T_3$ closes. Hereby the series connection of the resistor $r_3$, the transistor $T_3$, and the resistor $r_5$ results in a positive potential of the base of the transistor $T_2$ with the result that this transistor is opened and kept open until the stepping has been completed and $T_3$ is opened again due to positive potential from the deck $D_4$ which provides for the cancellation of the data signal.

The transistor $T_3$ has its base connected with the stationary contacts on the deck $D_4$ and is connected through a resistance $r'_3$ with the negative voltage source. This last-mentioned connection is necessary for stabilizing purposes.

The line 7 is connected with the network through a stabilizer resistor $r'$ and two semi-conductor diodes $d_4$ and $d_5$ (hereinafter referred to as valves) which protect the input transistor $T_1$ from voltage peaks induced in the data signal circuit; the valve $d_4$ will permit positive signals only to pass to the base of the transistor $T_1$ and prevent negative voltage peaks from reaching the transistor $T_1$. The valve $d_5$ which is connected with the positive terminal of the voltage source W branches off such voltage peaks which are more positive than the positive voltage source W.

As will be understood from the foregoing description the TSF network provides a plurality of convenient functions. In the network a stepping signal is produced in response to a data signal. This stepping signal will be maintained until the stepping means has performed its operation sufficiently to secure that the stepping has been initiated and will be completed. The cancellation prevents a standing data signal being able to cause an additional step in the case of faulty adjustment of the stepping means or due to an inconvenient time constant of the stepping means resulting from mass and inertia.

In addition the signal produced in the TSF network is a well-defined signal, and a well-defined signal can be applied to the command signal lines as well as to the stepping means. Furthermore, the transistors are able to operate with very short time constants with the result that also flash data signals can be handled.

As will be appreciated the arrangements described also avoid delay in the actuation of its machine functions due to the switching time of the progressive switch arrangement from one stage to the next following stage. In its example described in my U.K. Patents Nos. 878,902 and 878,903 each contact of the second deck of the progressive switch arrangement from which a command signal is transmitted does not become effective until the step has been completed. The command signal is produced simultaneously with the stepping signal and is immediately applied to the command signal deck $D_2$. It is, therefore, possible within the scope of the invention to construct the apparatus without the second deck $D_2$.

As appears from the foregoing description, each of the command relays is, depending on the cross-connection in the plug board, already at that stage of the progressive switch arrangement at which the respective data signal is received, connected with the negative terminal of the voltage source W through the line $x$ as well as with that outlet from the TSF network over which the positive voltage is applied.

Therefore, it is possible to use the data signal lines as supply lines to the relays, provided that command signals through the common part of the network are prevented from reaching the TSF network and operate as data signals.

Figure 5:
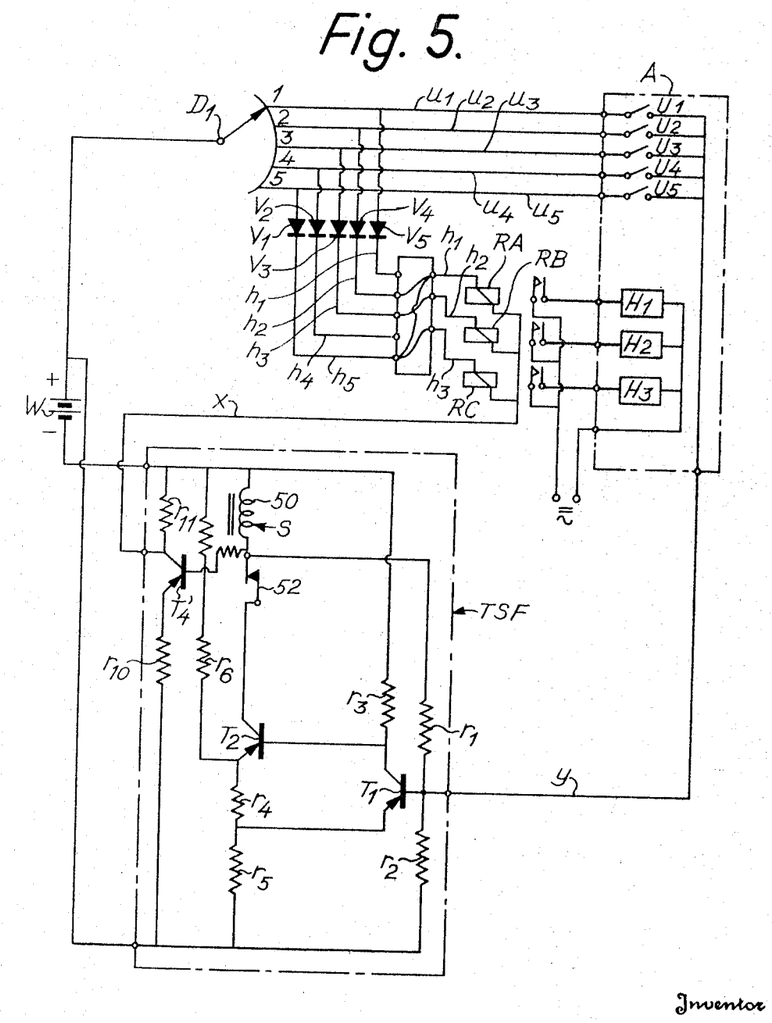
FIGURE 5 is a circuit arrangement of the apparatus of FIGURE 1 in a fourth embodiment.

A modification which shows this possibility is illustrated in FIGURE 5 in which the positive potential is applied to the relays directly from the data signal lines, while the line $x$ is connected to an outlet from the TSF network which has negative voltage relative to the data signal lines.

As shown in FIGURE 5 each of the command signal lines $h_1, h_2, h_3 \ldots$ is branched off from the respective data signal lines. In order to functionally separate the data signals and the command signals and prevent feedback from the relays to the input of the TSF network, valves $V_1, V_2, V_3 \ldots$ are included in the form of diodes in the command signal lines $h_1, h_2, h_3$. The line $x$ from the other end of the command relays is connected to an outlet from the TSF network which is negative relative to the voltage of the respective data signal lines, so as to enable current to flow through the respective command relays.

While in FIGURES 2, 3, and 4 the positive command signal for the machine function relays was taken from an output of the TSF network operated in conjunction with the energization of the stepping switch solenoid 50, provisions are made in the arrangement according to FIGURE 5 for obtaining the same function with negative command signals instead of positive signals.

To this end a further transistor $T'_4$ is included in the network in such a manner corresponding to the transistor $T_4$ in FIGURE 3 that when the transistor $T_2$ is closed, the transistor $T'_4$ will also be opened and hereby provide the necessary negative voltage for the line $x$.

More specifically, the base of the transistor $T'_4$ is connected over a stabilizing resistor with that end of the solenoid 50 which is remote from the negative terminal of the voltage source W. The emitter of the transistor $T'_4$ is connected with the positive voltage source through a resistor $r_{10}$ and the collector is connected with the negative voltage source through a resistor $r_{11}$. In the initial stage of the circuit the transistor $T_2$ is open whereby the base of the transisor $T'_4$ is connected with the negative voltage source through its stabilizing resistor and the coil 50. Hereby the emitter of the transistor $T'_4$ will be more positive than the base so that this transistor will be closed and current will flow through the resistors $r_{10}$ and $r_{11}$. The potential on the line $x$ will hereby remain positive so that the machine function relays cannot be energized in this condition. When a data signal is supplied through the line $y$, the transistors $T_1$ and $T_2$ will be shifted as described with reference to FIGURES 2 and 3 so that the transistors $T_2$ now will be closed to thereby energize the solenoid 50. By this closing the lower end of the solenoid 50 will become more positive to thereby also render the base of the transistor $T'_4$ more positive. The circuit is so adapted that by this change the base will become more positive than the emitter of the transistor $T'_4$ so that this transistor will be opened. This results in the line $x$ being connected with the negative voltage source through the resistor $r_{11}$ so as to close the circuits through the selected machine function relay. As soon as the switch 52 opens, the base of the transistor $T'_4$ will again become negative and thereby close the transistor to remove the negative potential from its collector.

When according to the embodiment illustrated in FIGURE 5 the switch $U_2$ is closed in position two of the progressive switch arrangement, this causes in the data signal line system a data signal to be applied to the input of the TSF network and in the manner hereinbefore described producing in the TSF network a signal operable to step the progressive switch arrangement. Simultaneously a negative voltage is applied to the line $x$ from the collector of the transistor $T'_4$ which means that the command relay RA in position two of the progressive switch arrangement is energized from the positive terminal of the voltage source W, the data signal line $u_2$, branched-off command signal line $h_2$, the cross-connection in the plug board $M_2$, the line $x$ and the outlet from the TSF network. Hereby the command relay RA is actuated and will be actuated again in position five due to the cross-connection shown in the plug board $M_2$.

As explained hereinbefore the arrangement shown and described provides for avoiding the time delay which otherwise is caused by the time it takes the progressive switch arrangement to shift from one stage to the next following stage. This also enables a further time-saving by providing electronic control of the command relays so as to enable the relays to be actuated in response to flash signals. In addition the invention provides for stepping the progressive switch arrangement in response to data flash signals produced by means of electronic circuits.

Figure 6:
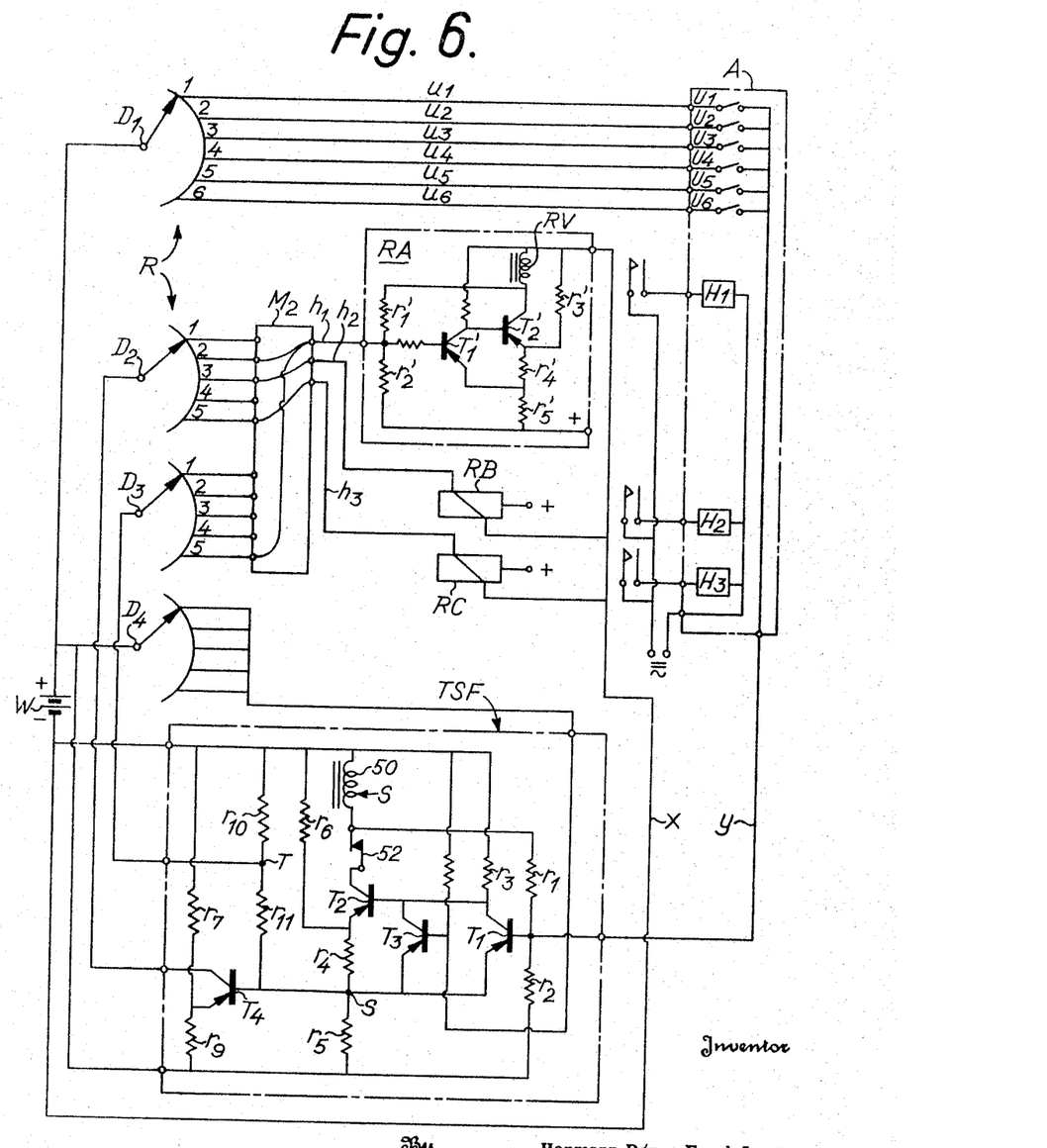
FIGURE 6 is a circuit arrangement of the apparatus of FIGURE 1 in a fifth embodiment.

In FIGURE 6 an embodiment is shown illustrating flash-sensitive relays. The relay winding RV is included in a bi-stable circuit comprising two transistors $T'_1$ and $T'_2$. The bi-stable circuit is adapted to be triggered alternately by positive and negative impulses. When triggered by a positive impulse the circuit will be brought into a self-stabilized condition in which the relay winding RV is energized so as to keep the machine function switches closed. When triggered by a negative impulse the circuit will be switched back to its initial condition in which the relay winding is de-energized so as to open the machine function switches.

More specifically, the input transistor $T'_1$ is connected to a voltage divider $r'_1, r'_2$. The transistor $T'_2$ is connected in series with the relay winding RV and is connected to a voltage divider $r'_3, r'_4$ and $r'_5$. The values of the resistors are so adapted that the base of the transistor $T'_1$ is positive relative to its emitter when the transistor $T'_2$ is open. Therefore, the input transistor $T'_1$ will remain open until it receives a negative signal. The relay winding RV is connected to operate as a part of the voltage divider for the transistor $T'_2$ only, and the value of the resistors $r'_4$ and $r'_5$ is relatively small so as to enable relatively large currents to flow through this part of the circuit. The potential between the resistors $r'_4$ and $r'_5$, i.e. on the emitter of the transistor $T'_1$ is when the transistor $T'_2$ is open only determined by the ratio between the relatively small resistors $r'_4$ and $r'_5$ and the somewhat larger resistor $r'_3$. If, for example, the resistor $r'_3$ is five times as large as the resistance in the relay winding, the potential on the emitter of the transistor $T'_1$ will be increased five times when the transistor $T'_2$ is closed. By way of example said potential may with the transistor $T'_2$ open be minus 1 volt and with the transistor $T'_2$ closed be minus 5 volts. The ratio between the resistors in the input circuit is of the magnitude 1:1.

As will be understood from the above explanation the transistor $T'_1$ will be opened upon receipt of a positive signal and remain open until it receives a negative signal. When a negative signal is applied to the base of the transistor $T'_1$, the base voltage will be more negative than the emitter voltage so the transistor will be closed hereby. By this closing the base of the transistor $T'_2$ will be connected to the positive voltage source through the resistor $r'_5$ and the voltage on the base will hereby be so much increased that it becomes more positive than the voltage on the emitter of the transistor $T'_2$ whereby this transistor will be opened. This means that the relay winding RV will be de-energized so that the machine function switch is opened. It will be seen that the relay is hereby brought to its initial condition. Hereby the relay arrangement operates with the relay winding as a polarized relay operable in response to well-defined command signals.

In connection with the embodiments described with reference to FIGURES 2–5, it was supposed that the relays were of the impulse-sensing type which alternatively were energized and de-energized upon receipt of a command signal. Therefore, according to these embodiments it is possible to supply the command signals over the same signal lines, i.e. from the deck $D_2$ in FIGURES 2, 3, and 4 and from the deck $D_1$ in FIGURE 5, and to distribute the command signals to the respective relays by means of appropriate cross-wiring of the plug board.

The embodiment shown in FIGURE 6 also requires supply of negative command signals in addition to the positive command signals. In order to separate these command signals from each other a further deck $D_3$ is included in the uniselector of FIGURE 6 operable to distribute the negative command signals. The positive command signals are derived from the TSF circuit, to the deck $D_2$ in the manner described with reference to FIGURE 3 and the negative command signals are derived from a point T at the TSF network.

The TSF network shown has a voltage divider $r_{10}$, $r_{11}$, $r_5$. The base of the transistor $T_4$ is connected to a point between the resistors $r_5$ and $r_{11}$, while a direct line to the deck $D_3$ is connected to the point T between $r_{10}$ and $r_{11}$. The emitter of the transistor $T_4$ is connected to a point between the voltage divider $r_7$ and $r_9$, while the collector of transistor $T_4$ is connected directly to the wiper of the deck $D_2$. When the transistor $T_2$ is closed in response to a positive signal through the y-line, the voltage at the points between the resistors $r_4$ and $r_5$ will be decreased so as to thereby render the base of the transistor $T_4$ less positive than its emitter whereby this transistor is closed and a positive potential derived from the point between the resistors $r_7$ and $r_9$ will be transmitted to the deck $D_2$. when the potential at the point S is decreased, also the potential at the point T is decreased. The resistors $r_{10}$, $r_{11}$, and $r_5$ are so designed that the potential at the point T will be shifted to negative and this negative potential is applied to the deck $D_3$. When the switch 52 is opened as described with reference to FIGURE 3, the transistor $T_4$ will also be opened so as to break the connection with the deck $D_2$ and the potentials at the points S and T will be increased so that the potential at the point T will shift from negative to positive.

The arrangement shown in FIGURE 6 operates in that way that the relay RA receives a positive command signal over the deck $D_2$ in position two of the movable contact of that deck, whereby the transistor $T'_1$ is opened and the transistor $T'_2$ is closed so as to energize the relay winding RV. The same is the case with the relay RB in position three and with the relay RC in position five. In position five the cross-connection shown in the multiple plug $M_2$ in addition to energizing the relay RC causes a negative command signal to be supplied to the relay RA from the deck $D_3$, whereby in the relay RA the transistor $T'_1$ is closed which causes the transistor $T'_2$ to be opened, whereby the relay winding is de-energized. The deck $D_4$ and the transistor $T_3$ operate as a "cancellation device" as described with reference to FIGURE 4.

It will be possible also to provide the TSF network with a further transistor which is open and closed together with the other transistors and from which the negative potential for the deck $D_3$ is taken instead of directly from the voltage divider $r_{10}$, $r_{11}$.

Figure 7:
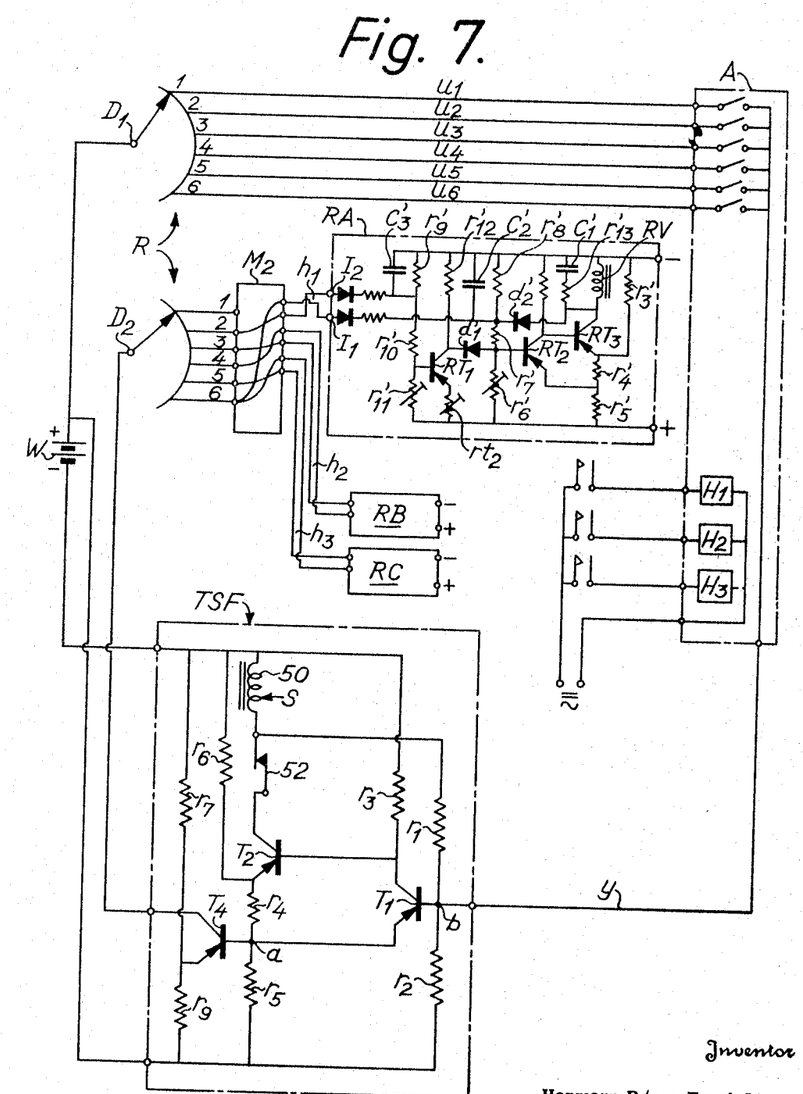
FIGURE 7 is a circuit arrangement of the apparatus of FIGURE 1 in a sixth embodiment.

FIGURE 7 shows an alternative relay arrangement included in a circuit arrangement with a TSF network as shown in FIGURE 3. In the arrangement according to FIGURE 7 the relay operates as a polarized relay in response to positive impulses only. The relay has two input terminals $I_1$ and $I_2$. Since only positive command signals need be applied, only one command signal deck $D_2$ is used, and in order to distribute the command signals to the one or the other of the two input terminals the output terminals from the plug board $M_2$ are duplicated so that as shown in FIGURE 7 the three relays RA, RB, RC will be actuated in the following manner:

At stage 2 of the progressive switch arrangement the relay RA is energized by means of a command signal to the input $I_1$. At stage 3 the relay RB is energized by means of a signal to the input $I_1$, and at stage 4 the relay RB is de-energized by a signal at the input $I_2$. At stage 5 the relay RC is energized by means of a signal to its input $I_1$, and eventually at stage 6 the connection shown in the plug board distributes command signals to the input termains $I_1$ of the relay RA as well as the relay RC so that at stage 6 both these relays are de-energized.

The circuit arrangement shown with respect to the relay RA includes three transistors $RT_1$, $RT_2$ and $RT_3$, of which the transistor $RT_3$ is connected in series with the relay winding RV. The transistors $RT_2$ and $RT_3$ form a bi-stable circuit which is adapted to be switched to the one condition by means of a positive impulse signal applied to the base of the transistor $RT_2$ from the input point $I_1$, while shifting of the bi-stable circuit to its other condition is controlled by the transistor $RT_1$ which in its turn is controlled by a positive signal applied to its base through the other input terminal $I_2$.

In the initial condition the transistor $RT_2$ is closed so as to render the base of the transistor $RT_3$ sufficiently positive to keep it open whereby the relay winding RV is de-energized. The input terminal $I_1$ is connected with a voltage divider $r'_6$, $r'_7$, $r'_8$ which is the voltage divider from which the base of the transistor $RT_2$ is supplied with such a relatively negative potential to enable this transistor to be kept closed. When, however, a positive signal is applied to the input $I_1$ this will cause the voltage on the base of the transistor $RT_2$ to be increased so much that the transistor is opened with the result that the voltage on its collector and thereby on the base of the transistor $RT_3$ will become negative so that this latter transistor will be closed and the relay winding RV energized.

The input $I_2$ is connected with a voltage divider $r'_9$, $r'_{10}$, $r'_{11}$ which, as long as no positive signal is applied to the input $I_2$ serves to render the base of the transistor $RT_1$ less positive than the emitter of this transistor so as to thereby keep the transistor closed. In this closed condition the potential on the collector of the transistor $RT_1$ will also be positive but due to the valve $d'_1$ and the biasing resistor $r'_{12}$ this potential cannot be applied to the base of the transistor $RT_2$. When a positive potential is applied from the machine function deck $D_2$ to the input point $I_2$ this will cause the potential on the base of the transistor $RT_1$ to be increased so that this transistor will hereby be opened. The collector of this transistor is connected with the negative voltage source through the resistance $r'_{12}$ so that the potential thereon will be negative. Hereby current will flow from the base of the transistor $RT_2$ through the valve $d'_1$ which is sufficient to make the base of the transistor $RT_2$ negative and render its collector positive from the voltage divider $r'_4$, $r'_5$ which increases the potential on the base of the transistor $RT_3$ and opens the transistor.

This means that when a positive signal is applied to the input $I_2$ the transistor $RT_3$ will be opened so as to de-energize the relay winding RV. When the current through the relay winding is broken, the voltage peak induced in the coil is applied to an RC-line $r'_{13}$, $C'_1$ which is shunted across the coil so as to act as a "spark-extinguisher" to protect the transistor $RT_3$. Condensers $C'_2$ and $C'_3$ are connected across the resistors $r'_8$ and $r'_9$ in the input lines of the circuit. These condensers have relatively high capacitance so as to be able to absorb any flash signals or alternating currents induced in the input lines. By this precaution it is ensured that the relay circuit described will respond to such signals only which are applied with a predetermined minimum duration.

When the transistor $RT_1$ is open in response to a positive signal applied on the input $I_2$, the base of the transistor $RT_2$ will be relatively negative to thereby keep the transistor $RT_3$ in the open condition as described above. The voltage dividers are so designed that as long as a positive signal is applied to the input $I_2$ a positive signal simultaneously applied to the input $I_1$ will not be sufficient to increase the voltage on the base of the transistor $RT_2$ sufficiently to open this transistor. This means that the input $I_2$ will be dominating so that the relay will always be de-energized if, due to any faulty operation or short-circuiting in the network, or due to other reasons, the two inputs should receive a command signal at the same time.

While in the foregoing I have described a plurality of embodiments of circuit arrangements according to the invention, it will be understood that the invention is not limited to the embodiments shown and described and that further modifications and/or combinations of the various circuit arrangements may be possible within the scope of the invention.

What I claim is:

1. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, an electronic network effectively providing indexing means operable to produce indexing signals, means operatively connecting said data signal means with said indexing means to render said indexing means operable to produce one indexing signal only in response to each data signal, means operatively connecting said indexing means with said progressive switch means to switch said progressive switch means by means of each of said indexing signals to effectively provide data logging represented by numerical values of said progressive switch means, and means operatively connecting said progressive switch means with said operation performing members operable to supply and distribute command signals to said operation performing members at predetermined stages of said progressive switch means.

2. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, an electronic network effectively providing indexing means operable to produce indexing signals including first means operable to initiate the production of an indexing signal, second means operable to complete an initiated indexing signal and third means operable to reset said indexing means, means operatively connecting said data signal means with said indexing means to render said indexing means operable to produce one indexing signal only in response to each data signal, means operatively connecting said indexing means with said progressive switch means to shift said progressive switch means by means of each of said indexing signals to effectively provide data logging represented by numerical values of said progressive switch means, and means operatively connecting said progressive switch means with said operation performing members operable to supply and distribute command signals to said operation performing members at predetermined stages of said progressive switch means.

3. In an automatic control system for use with a working machine having a plurality of electrically controlled operation performing members adapted to be controlled by means of command signals, and a plurality of data signal means adapted to produce electrical data signals indicative of the progress of the operation cycle in combination: progressively operable switch means having a plurality of stages and adapted to be switched in response to receipt of an indexing signal, and indexing means operable to produce indexing signals including an electronic input member operable to be actuated in response to receipt of a data signal and an electronic output member operable to produce an indexing signal in response to the actuation of the input member, produce one indexing signal only in response to each data signal, means operatively connecting said indexing means with said progressive switch means to shift said progressive switch means by means of each of said indexing signals to effectively provide data logging represented by numerical values of said progressive switch means, and means operatively connecting said progressive switch means with said operation performing members operable to supply and distribute command signals to said operation performing members in predetermined correlation to the data signals.

4. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, an electronic network effectively providing indexing means operable to produce indexing signals including first means operable to initiate the production of an indexing signal, second means operable to complete an initiated indexing signal and third means operable in response to predetermined completion of the indexing of said progressive switch means to reset said indexing means, means operatively connecting said data signal means with said indexing means to render said indexing means operable to produce one indexing signal only in response to each data signal, means operatively connecting said indexing means with said progressive switch means to shift said progressive switch means by means of each of said indexing signals to effectively provide data logging represented by numerical values of said progressive switch means, and means operatively connecting said progressive switch means with said operation performing members operable to supply and distribute command signals to said operation performing members at predetermined stages of said progressive switch means.

5. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, an indexing means operable to produce indexing signals having a data signal sensitive input and an indexing signal output, means operatively connecting said data signal means with said indexing means to render said indexing means operable to produce one indexing signal only in response to each data signal including cancellation means operable to render said input insensitive for a data signal during a predetermined time interval of the indexing process, means operatively connecting said indexing means with said progressive switch means to shift said progressive switch means by means of each of said indexing signals to effectively provide data logging represented by numerical values of said progressive switch means, and means operatively connecting said progressive switch means with said operation performing members operable to supply and distribute command signals to said operation performing members at predetermined stages of said progressive switch means.

6. In an automatic control system for use with a working machine having a plurality of electrically controlled operation performing members adapted to be controlled by means of command signals and data signal means adapted to produce electrical data signals indicative of the progress of the operation cycle in combination: progressively operable main switch means having a plurality of stages and adapted to be switched in response to receipt of an indexing signal, an indexing means operable to produce indexing signals having a data signal sensitive input and an indexing signal output, and control means operable to alternately rendering said input and output effective including reset means operable to render said input effective, means operatively connecting said data signal means with said indexing means to render said indexing means operable to produce one indexing signal only in response to each data signal including auxiliary progressive switch means operable to be switched in synchronism with said main switch means, means operatively connecting said auxiliary progressive switch means with said indexing means to render said reset means ineffective until predetermined completion of said indexing operation means operatively connecting said indexing means with said progressively operable main switch means to shift said progressive switch means by means of each of said indexing signals to effectively provide data logging represented by numerical values of said progressively operable main switch means, and means operatively connecting said progressively operable main switch means with said operation performing members operable to supply and distribute command signals to said operation performing members at predetermined stages of said progressive switch means.

7. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, a bi-stable electronic network having an inoperative and an operative condition, means operatively connecting said bi-stable network with said progressively operable switch means to supply an indexing signal from said bi-stable network to said progressive switch means in the operative condition of said bi-stable network, means operatively connecting said bi-stable network with said data signal means operable to shift said bi-stable network from said inoperative to said operative condition only in response to each data signal, means operable to reset said bi-stable network from said operative to said inoperative condition after supply of an indexing signal to said progressive switch means, and means operatively connecting said progressive switch means with said operation performing members operable to supply and distribute command signals to said operation performing members at predetermined stages of said progressive switch means.

8. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapter to be switched in response to receipt of an indexing signal, a bi-stable electronic network having an inoperative and an operative condition, means operatively connecting said bi-stable network with said progressively operable switch means to supply an indexing signal from said bi-stable network to said progressive switch means in the operative condition of said bi-stable network, means operatively connecting said bi-stable network with said data signal means operable to switch said bi-stable network from said inoperative to said operative condition only in response to each data signal when said bi-stable network is in its inoperative condition, time responsive means operable to switch said bi-stable network back from said operative to said inoperative condition after supply of an indexing signal to said progressive switch means, and means operatively connecting said progressive switch means with said operation performing members operable to supply and distribute command signals to said operation performing members at predetermined stages of said progressive switch means.

9. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, a bi-stable electronic network having an inoperative and an operative condition, means operatively connecting said bi-stable network with said progressively operable switch means to supply an indexing signal from said bi-stable network to said progressive switch means in the operative condition of said bi-stable network, means operatively connecting said bi-stable network with said data signal means operable to switch said bi-stable network from said inoperative to said operative condition only in response to each data signal when said bi-stable network is in its inoperative condition, means operable in response to predetermined completion of the switching of said progressive switch arrangement to switch said bi-stable network back from said operative to said inoperative condition after supply of an indexing signal to said progressive switch means, and means operatively connecting said progressive switch means with said operation performing members operable to supply and distribute command signals to said operation performing members at predetermined stages of said progressive switch means.

10. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, a bi-stable electronic network having an inoperative and an operative condition, means operatively connecting said bi-stable network with said progressively operable switch means to supply an indexing signal from said bi-stable network to said progressive switch means in the operative condition of said bi-stable network, means operatively connecting said bi-stable network with said data signal means operable to switch said bi-stable network from said inoperative to said operative condition only in response to each data signal, means in said bi-stable network operable in said operative condition thereof to supply a command signal, means operable to reset said bi-stable network to said inoperative condition after supply of an indexing signal to said progressive switch means, and means operatively connecting said bi-stable network with said operation performing members operable to supply and distribute said command signals to said operation performing members at predetermined stages of said progressive switch means.

11. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, a bi-stable electronic transistor network having a first and a second transistor effectively providing an inoperative and an operative condition, means operatively connecting said bi-stable network with said progressively operable switch means to supply an indexing signal from said second transistor to said progressive switch means in the operative position of said bi-stable network, means operatively connecting said first transistor of said bi-stable network with said data signal means to render said first transistor operable to switch said second transistor to effectively provide said operative condition only in response to a data signal, reswitch means operable to switch said bi-stable network back to said inoperative condition after supply of an indexing signal to said progressive switch means, and means operatively connecting said progressive switch means with said operation performing members operable to supply and distribute command signals to said operation performing members at predetermined stages of said progressive switch means.

12. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and adapted to be switched in response to receipt of an indexing signal, a bi-stable electronic network having an input member and an output member connected to be alternately inoperative and operative, means operatively connecting said bi-stable output member with said progressively operable switch means to supply an indexing signal from said bi-stable network to said progressive switch means in the operative position of said output member, means operatively connecting said bi-stable input member with said data signal means operable to switch said bi-stable network from said inoperative to said operative condition of said output member only in response to a data signal on said input member, means operable to switch said bi-stable network back from said operative to said inoperative condition of said input member after supply of an indexing signal to said progressive switch means, and means operatively connecting said progressive switch means with said operation performing members operable to supply and distribute command signals to said operation performing members at predetermined stages of said progressive switch means.

13. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor, means operatively connecting said progressive switch means with said data signal means to effectively provide data logging represented by numerical values of said progressive switch means, means including relay means each having a relay winding, a bi-stable circuit network including said relay winding and having an operative condition operable to energize said relay winding and an inoperative condition rendering the energization of said relay winding ineffective, and relay contact means, means connecting said relay contact means with said operation performing members to initiate a machine function in response to energization of said relay means and terminate the machine function in response to de-energization of said relay means, and means operatively connecting said progressive switch means with said bi-stable circuit network of said relay means to selectively switch each of said bi-stable circuit means at predetermined stages of said progressive switch means to provide said operative condition of said bi-stable circuit means in stage-responsive relationship to initiate the respective machine function and to provide the inoperative condition of said bi-stable means to terminate the respective machine function.

14. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor, means operatively connecting said progressive switch means with said data signal means to effectively provide data logging represented by numerical values of said progresive switch means, means including relay means each having a relay winding, a bi-stable circuit network including a controlled member included in a voltage divider with said relay winding and a control member having an operative and an inoperative condition and being operatively connected with said controlled member to alternately energize and de-energize said relay winding in response to application of consecutive command signals to said control member, and relay contact means, means connecting said relay contact means with said operation performing members to initiate a machine function in response to energization of said relay means and terminate the machine function in response to de-energization of said relay means, and means operatively connecting said progressive switch means with said control member of said bi-stable circuit network of said relay means to apply consecutive command signals to said control member at predetermined stages of said progressive switch means to initiate and terminate the respective machine functions.

15. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor, means operatively connecting said progressive switch means with said data signal means to effectively provide data logging represented by numerical values of said progressive switch means, means including relay means each having a relay winding, a bi-stable circuit network including said relay winding and having first means operatively connected to be switched on and off in opposite relationship and having said relay winding connected in series with said second means to effectively energize and de-energize said relay winding in response to consecutive switching of said first means, and relay contact means, means connecting said relay contact means with said operation performing members to initiate a machine function in response to energization of said relay means and terminate the machine function in response to deenergization of said relay means, and means operatively connecting said progressive switch means with said first bi-stable means of said relay means to selectively switch each of said bi-stable circuit means at predetermined stages of said progressive switch means to energize said relay windings in stage-responsive relationship to initiate the respective machine functions and to de-energize said relay windings to terminate the respective machine function.

16. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor, means operatively connecting said progressive switch means with said data signal means to effectively provide data logging represented by numerical values of said progressive switch means, means including relay means each having a bi-stable circuit network including first and second bi-stable switch on-and-off means connected to be in opposite operating condition and having a relay winding in series with said second bi-stable means to energize and deenergize said relay winding, a first input of said network operatively connected with said first bi-stable means to effectively energize said relay winding, a second input of said network operatively connected with said first bi-stable means for effectively de-energizing said relay winding and relay contact means, means connecting said relay contact means with said operation performing members to initiate a machine function in response to energization of said relay means and terminate the machine function in response to de-energization of said relay means, and means including distributor means operatively connecting said progressive switch means with said first network input means to selectively energize said relay windings at predetermined stages of said progressive switch means to initiate the respective machine functions as well as means operatively connecting said progressive switch means with said second network inputs to selectively deenergize said relay windings at predetermined stages of said progressive switch means to terminate the respective machine functions.

17. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor, means operatively connecting said progressive switch means with said data signal means to effectively provide data logging represented by numerical values of said progressive switch means, means including relay means each having a relay winding, a bi-stable transistor circuit network including said relay winding and having a first input and a second input, means operatively connecting said first input to effectively provide an operative network condition energizing said relay winding in response to application of a command signal to said first input, means operatively connecting said second input to effectively provide an inoperative condition de-energizing said relay winding in response to application of a command signal to said second input, means in said network operable to render a signal on said first input ineffective when a signal is applied to said second input, and relay contact means, means connecting said relay contact means with said operation performing members to initiate a machine function in response to energization of said relay means and terminate the machine function in response to de-energization of said relay means, and means including distributor means operatively connecting said progressive switch means with said first network input means to selectively energize said relay windings at predetermined stages of said progressive switch means to initiate the respective machine functions as well as means operatively connecting said progressive switch means with said second network inputs to selectively de-energize said relay windings at predetermined stages of said progressive switch means to terminate the respective machine functions.

18. In an automatic control system for use with a working machine having a plurality of electrically controlled operation performing members adapted to be controlled by means of command signals and data signal means adapted to produce electrical data signals indicative of the progress of the operation cycle in combination: progressively operable switch means having a plurality of stages and indexing means therefor including first means operable to produce command signals of a first polarity and second means operable to produce command signals of a second polarity, means operatively connecting said progressive switch means with said data signal means to effectively provide data logging represented by numerical values of said progressive switch means, means including relay means each having a relay winding, a bi-stable circuit network including said relay winding having an operative condition operable to energize said relay winding and an inoperative condition rendering the energization of said relay winding ineffective, and relay contact means, and including means operable to provide said operative condition in response to a command signal of said first polarity and to provide said inoperative condition in response to a command signal of said second polarity, means connecting said relay contact means with said operation performing members to initiate a machine function in response to energization of said relay means and terminate the machine function in response to de-energization of said relay means, and means including distributor means operatively connecting said first-command signal producing means of said progressive switch means with said bi-stable circuit networks of said relay means to selectively provide said operative condition of said bi-stable circuit means at predetermined stages of said progressive switch means to initiate the respective machine functions and to terminate the respective machine function, and means operatively connecting said second command signal producing means with said bi-stable networks to selectively provide said inoperative conditions at predetermined stages.

19. In an automatic control system for use with a working machine having a plurality of electrically controlled operation performing members adapted to be controlled by means of command signals and data signal means adapted to produce electrical data signals indicative of the progress of the operation cycle in combination: progressive switch means having a plurality of stages representing numerical values and an electronic network effectively providing indexing means for said progressive switch means, means operable to derive command signals from said progressive switch means, means operatively connecting said progressive switch means with said operation performing members operable to distribute said command signals to said operation performing members to initiate and terminate said machine functions in preprogrammed relationship, means operatively connecting said data signal means with said progressive switch means to effectively provide data logging represented by said numerical values of said progressive switch means, and means in said data signal means operable to provide a first data signal in response to a first condition and a second data signal in response to a second condition, an external source operable to provide said first condition, a machine function operable to provide said second condition, and means connecting said data signal means to provide data logging in the form of one stage of said progressive switch means in response to said second condition and a consecutive stage in response to said first condition.

20. In an automatic control system for use with a working machine having a plurality of electrically controlled operation performing members adapted to be controlled by means of command signals and data signal means adapted to produce electrical data signals indicative of the progress of the operation cycle in combination: progressive switch means having a plurality of stages representing numerical values and indexing means therefor, means operable to derive command signals from said progressive switch means, means operatively connecting said progressive switch means with said operation performing members operable to distribute said command signals to said operation performing members to initiate and terminate said machine functions in preprogrammed relationship, means operatively connecting said data signal means with said progressive switch means to effectively provide data logging represented by said numerical values of said progressive switch means, and means in said data signal means operable to respond to an external light source to provide a first data signal in response to a throw-out of a workpiece which renders said light source inoperative, and a second data signal in response to the operative condition of said light source, an external light source operable to provide said second data signal, a workpiece throw-out means function operable to provide said first data signal, and individual data signal lines operable to transmit said first and said second data signal to provide data logging at individual stages of said progressive switch means.

21. In an automatic control system for use with a working machine having a plurality of electrically controlled operation performing members adapted to be controlled by means of command signals and data signal means adapted to produce electrical data signals indicative of the progress of the operation cycle in combination: progressive switch means having a plurality of stages representing numerical values and indexing means therefor, means operable to derive command signals from said progressive switch means, means operatively connecting said progressive switch means with said operation performing members operable to distribute said command signals to said operation performing members to initiate and terminate said machine functions in preprogrammed relationship, means operatively connecting said data signal means with said progressive switch means to effectively provide data logging represented by said numerical values of said progressive switch means, and means in said data signal means including a light-sensitive member and a light source operable to transmit a light beam to said member and being operable to provide a first data signal in response to interruption of said light beam, and a second data signal in response to presence of said light beam, and a machine function means operable to interrupt said light beam, and means connecting said data signal means to provide data logging of said first and said second data signal at two stages of said progressive switch means.

22. In an automatic control system for use with a working machine having a plurality of electrically controlled operation performing members adapted to be controlled by means of command signals and data signal means adapted to produce electrical data signals indicative of the progress of the operation cycle in combination: progressive switch means having a plurality of stages representing numerical values and indexing means therefor, means operable to derive command signals from said progressive switch means, means operatively connecting said progressive switch means with said operation performing members operable to distribute said command signals to said operation performing members to initiate and terminate said machine functions in preprogrammed relationship, means operatively connecting said data signal means with said progressive switch means to effectively provide data logging represented by said numerical values of said progressive switch means, means in said data signal means operable to respond to a flash function of said machine function means and including a bi-stable network having a first operating condition and a second operating condition, an external source, means in said bi-stable network operable to provide said first operating condition in response to the operation of said external source and to provide said second operating condition in response to said flash operation, means in said bi-stable network operable to derive a first data signal therefrom in response to said first operating condition and a second data signal in response to said second operating condition, and means operatively connecting said bi-stable network with said progressive switch to effectively provide logging of said second data signal at one stage of said progressive switch means and logging of said first data signal at a subsequent stage of said progressive switch means.

23. In an automatic control system for use with a working machine having a plurality of electrically controlled operation performing members adapted to be controlled by means of command signals and data signal means adapted to produce electrical data signals indicative of the progress of the operation cycle in combination: progressive switch means having a plurality of stages representing numerical values and indexing means therefor, means operable to derive command signals from said progressive switch means, means operatively connecting said progressive switch means with said operation performing members operable to distribute said command signals to said operation performing members to initiate and terminate said machine functions in preprogrammed relationship, means operatively connecting said data signal means with said progressive switch means to effectively provide data logging represented by said numerical values of said progressive switch means, means in said data signal means operable to respond to a workpiece throw-out function of said machine function means and including a bi-stable network having a first operating condition and a second operating condition, an external light source, light-sensitive means in said bi-stable network having a resistance varying with light intensity and being operable to provide said first operating condition in response to the operation of said external light source and to provide said second operating condition in response to change of said light intensity by said throw-out function, means in said bi-stable network operable to derive a first data signal therefrom in response to said first operating condition and a second data signal in response to said second operating condition and means operatively connecting said bi-stable network with said progressive switch to effectively provide logging of said second data signal at one stage of said progressive switch means and logging of said first data signal at a subequent stage of said progressive switch means.

References Cited by the Examiner
UNITED STATES PATENTS

| | | |
|---|---|---|
| 2,029,335 | 2/1936 | Oberhoffren. |
| 2,427,493 | 9/1947 | Bullard. |
| 2,575,792 | 11/1951 | Bullard et al. |
| 2,898,483 | 8/1959 | Muller _________ 340—147 |

NEIL C. READ, *Primary Examiner.*

P. XIARHOS, D. YUSKO, *Assistant Examiners.*